Sept. 19, 1933.  C. B. GILMORE  1,927,209
CONTROL APPARATUS FOR AUTOMOBILES
Filed Aug. 21, 1929   4 Sheets-Sheet 3

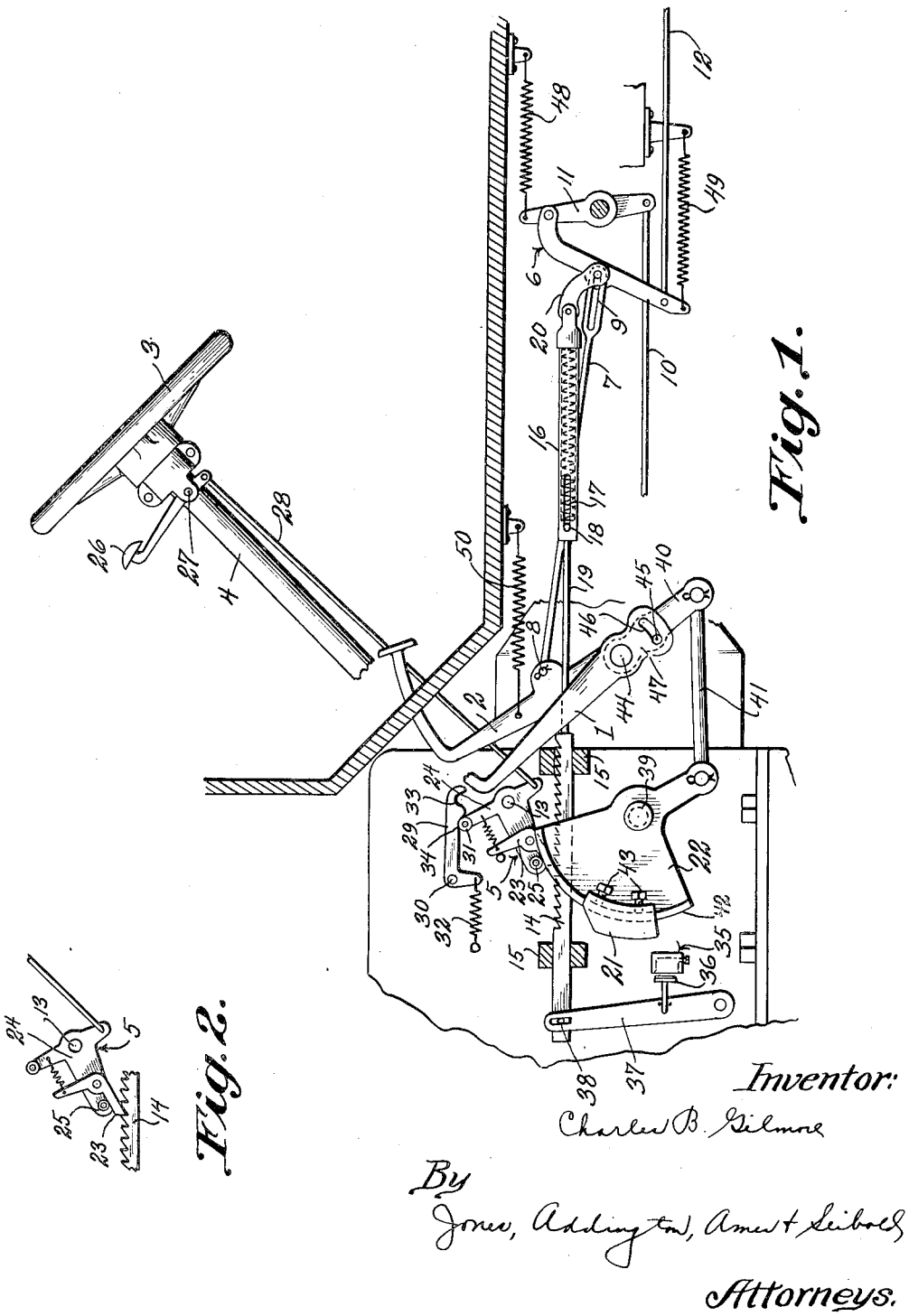

Inventor:
Charlie B. Gilmore
By
Jones, Addington, Ames & Seibold
Attorneys.

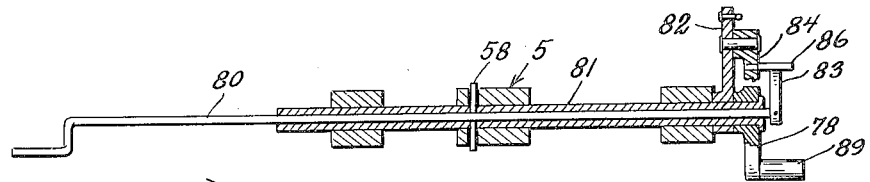
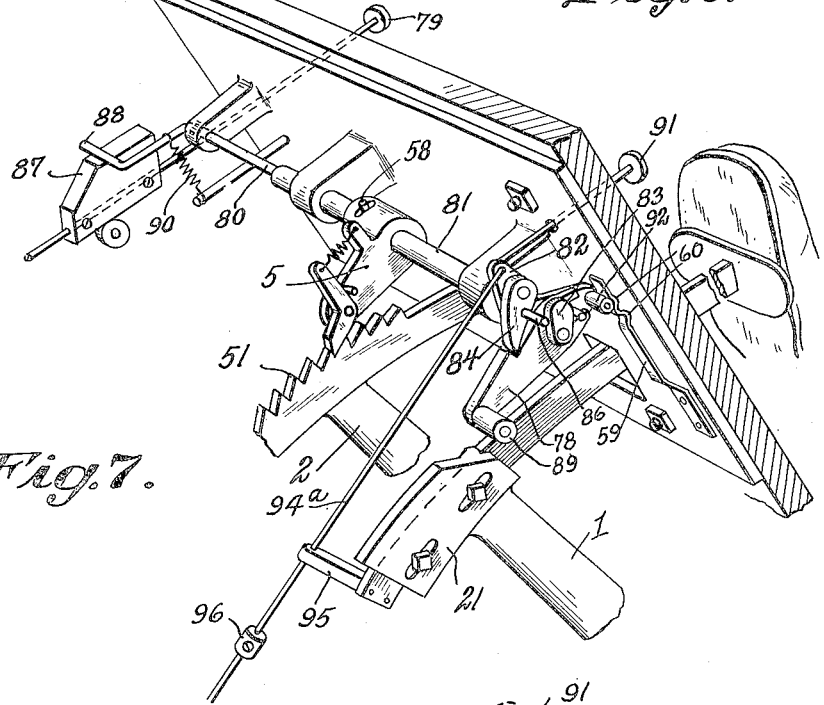
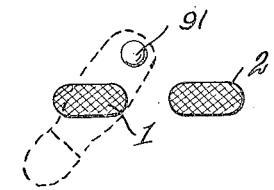
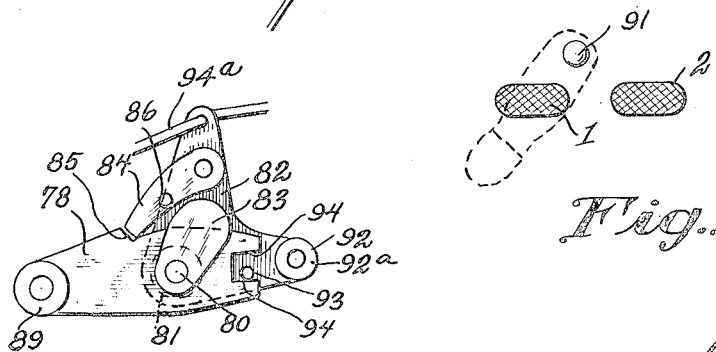

Patented Sept. 19, 1933

1,927,209

UNITED STATES PATENT OFFICE 1,927,209

CONTROL APPARATUS FOR AUTOMOBILES

Charles B. Gilmore, Chicago, Ill.

Application August 21, 1929. Serial No. 387,274

9 Claims. (Cl. 192—.01)

My invention relates to control mechanism for automobiles and more particularly to control mechanism for the brake mechanism and clutch mechanism.

One of the objects of my invention is to provide means whereby the driver may, if he desires, cause the brake to be held applied automatically, thereby relieving the driver of the necessity for holding his foot on the brake pedal after the vehicle is stopped. This is often desirable; one situation where it is desirable being in the event the driver has to stop on a grade.

A further object of my invention is to provide means whereby the brakes will be released upon the accelerating movement of the accelerator means. By this construction, it will be seen that the car may be held on an incline without any effort on the part of the driver, but that as soon as the driver presses on the accelerator, the brakes will be released, and the engine accelerated by the one simple operation of pressing down on the accelerator button.

A further object of my invention is to provide means whereby the clutch may be in operative position while the brake holding mechanism is holding the brake such as is desirable when the car is standing and the gears are shifted to a neutral position.

A further object of my invention is to provide means whereby the automatic brake and clutch controlling means may be rendered inoperative when desired, at the will of the driver, so that the car is controlled in exactly the same manner in which it would be controlled if my improved brake and clutch controlling means were not present.

A further object of my invention is to provide a construction in which the brake may be held applied without any effort on the part of the driver when driving in traffic, but in which the brake is released automatically in the ordinary operation of starting up again.

Further objects will appear from the description and claims.

In the drawings, in which an embodiment of my invention is shown,

Figure 1 is a side elevational view of a brake and clutch construction embodying my invention;

Fig. 2 is a detailed view of a latch mechanism used in Fig. 1;

Fig. 7 is a perspective view showing still another form of my invention;

Fig. 8 is a detailed view of the clutch-operated lever and associated parts;

Fig. 9 is an axial sectional view of a rock shaft and associated parts; and

Fig. 10 is a view showing the relation of the foot-controlled button and pedals.

Figure 3:
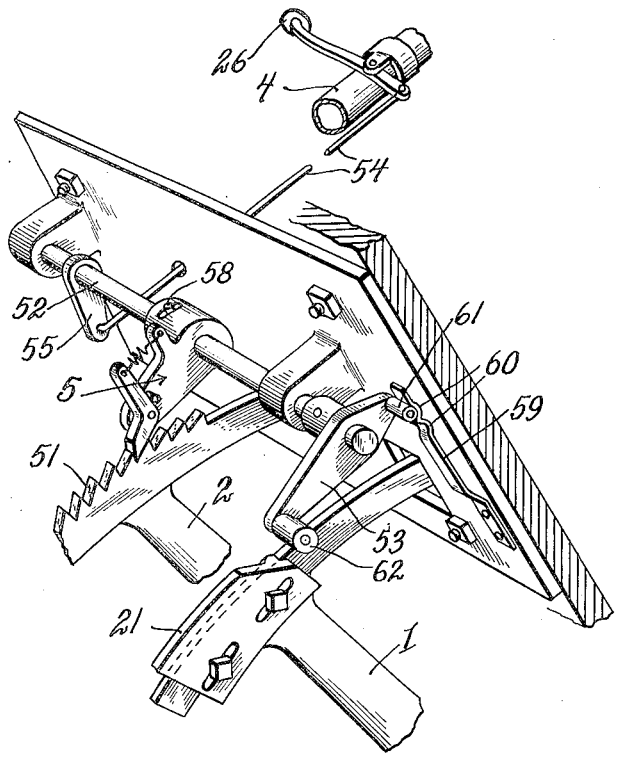
Fig. 3 is a perspective view showing a different form of my invention.

Referring to the drawings in detail and first to Figs. 1 and 2, the construction shown therein comprises the clutch pedal 1, the brake pedal 2, the steering wheel 3 and steering column 4, latch mechanism 5 for holding the brake in applied position, and clutch-controlled means for releasing the latch.

The brake pedal is connected with equalizer mechanism 6 by means of a link 7 pivotally secured to the brake pedal at 8 and having a pin and slot connection with the equalizer mechanism 6 at 9. This pin and slot lost-motion connection is provided in order that the brake pedal may return, when depressed, independently of the equalizer lever 6 to avoid an uncontrolled spring return of this pedal upon the release of the latch 5 which may be holding the brakes applied. The equalizer lever is connected with the brake rod 10 for the front wheel brakes through the spring-controlled rock arm 11 and is directly connected with the brake rod 12 for the rear wheel brakes. The latch member 5 pivotally mounted at 13 is engageable and disengageable with respect to the ratchet member 14 slidably mounted in the guides 15 and having a lost-motion spring connection with the equalizer lever 6.

This lost-motion spring connection comprises a spring barrel 16 having slots 17 in its sides in which the T-head 18 of the rod 19 secured to the slidable ratchet 14, is mounted. This spring barrel is connected with the equalizer lever by means of a link 20. The lost-motion spring connection between the ratchet slide and the equalizer lever is provided in order that the equalizer lever may be operated by means of the pedal even if the latch slide should stick.

The pivoted latch, shown in detail in Fig. 2, is made so that it can be easily released by means of the cam 21 on the clutch-controlled rock member 22. For this purpose it is formed in two parts, which parts have a sort of lock toggle action, the dog 23 which engages the ratchet member 14 being pivotally mounted on the rock member 24 of the latch and so designed and proportioned that when in the position shown in Figs. 1 and 2 in which the dog is in engagement with the pin 25 on the rock member the dog will be moved past the dead center position with respect to the pivotal point 13 of the rock member and the point of the dog 23 so that pressure tending to move the ratchet slide member 14 to the right will not break the toggle formation but will rather tend to hold the toggle more firmly against the pin 25. However, when the cam 21 on the clutch-controlled rock member 22 engages the pin 25, it easily breaks the toggle formation, thus effecting an easy quick release of the latch member.

If desired, a manual control may be provided for the latch member 5 by means of which it may be moved either to operative or inoperative position. This comprises a hand lever 26 pivotally mounted at 27, in a position convenient for operation by the driver, connected with the latch 5 by means of a link 28. In order to hold the latch member in either operative or inoperative position, a second latch member 29 is provided pivotally mounted at 30 and held in engagement with the roller 31 on the first latch member 5 by means of a tension spring 32. This second latch member has two depressions 33 and 34 positioned so that when the roller 31 is in the depression 34 the latch will be in operative position and when the roller 31 is in the other depression 33 the latch will be in inoperative position.

In order to cushion the return movement of the ratchet slide and thus preventing noise and jarring, a dash-pot construction is provided comprising a dash-pot chamber 35 and a dash-pot plunger 36 mounted to cooperate with this chamber on a rock arm 37 having a pin and slot connection 38 with the ratchet slide 14.

The clutch control mechanism for breaking the toggle to release the latch comprises the rock member 22 pivotally mounted at 39 and connected with the downward extension 40 of the clutch pedal by means of a link 41. The cam member 21 which cooperates with the roller 25 on the latch 5 to release the latter is adjustably mounted on the rock member 22 by providing it with an arcuate groove to receive an arcuate flange 42 on the rock member 22. A pair of set screws 43 are provided for holding the cam in adjusted position.

The downward extension 40 is angularly adjustable with respect to the clutch pedal and is a part of the clutch throw mechanism and the adjustment is for the purpose of permitting the clutch pedal itself to be adjusted to operate in the desired relation to the floor board as the clutch faces wear thus changing the connecting position of the same. I, therefore, operate the release member 21 from the extension 40 so that when the pedal is adjusted it will not change the point of brake release relative to the clutch engagement. The block or cam 21 only should be adjusted for releasing the brake at the proper time. This angular adjustment is accomplished by making the downward extension 40 a separate piece from the clutch pedal and mounting it for pivotal movement about the axis 44 of the pedal and adjustably securing it to the clutch pedal by means of a set screw 45 extending through a slot 46 in a downward extension 47 of the clutch pedal and threaded into the rock member 40 to which the link 41 is secured.

In operation, if it is desired to make the brake-holding latch 5 effective, the hand lever 26 is moved to bring the latch member into operative position as shown in Fig. 1. This can be accomplished in the event the clutch is in disconnecting position, as when the clutch is in connecting position, the cam 21 would be in position in the path of the roller 25 on the latch 5 and would block its movement to latching position. With this construction the brake will be held applied so long as the clutch pedal is held depressed. However, as soon as the clutch pedal is released and allowed to move to connecting position, the cam 21 on the rock member releases the latch 5 and permits the brake-holding slide 14 to be released and the brakes to move to off position under the action of the springs 48 and 49 provided for this purpose.

As previously indicated, the brake pedal 2 is permitted to return to its upper position under the action of the spring 50 even when the ratchet slide is held by the latch member 5, this action being permitted because of the pin and slot connection 9 between the link 7 and the equalizer lever 6.

Figure 4:
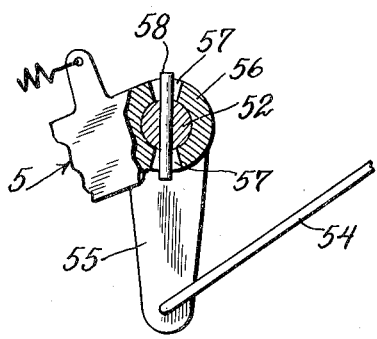
Fig. 4 is a detail of the latch construction of Fig. 3.

In the construction shown in Figs. 3 and 4, the brake pedal 2 itself is provided with a ratchet portion 51 for cooperation with a toggle latch 5 similar to that shown in Fig. 2, this toggle latch having a lost-motion connection with the rock shaft 52 to which is secured a rock arm 53 controlled by the cam member 21 on the clutch pedal 1. In this form also a hand lever 26 may be provided for placing the latch member 5 in operative relation with respect to the ratchet 51 on the brake pedal. This hand lever is connected with the rock shaft 52 by means of a link 54 pivotally secured at one end to the hand lever 26 and pivotally secured at its other end to the rock arm 55 on the rock shaft 52.

In operation, as in Figs. 3 and 4, the brake pedal 2 and the clutch pedal 1 being both depressed the latch 5 may be placed in operative relation with respect to the ratchet 51 by means of the hand lever 26 desirably after the car has stopped and while the driver is yet holding the brake and clutch pedals 1 and 2 depressed. If it is desired to apply the brake an additional amount after the latch member 5 has been brought into operative relation with the ratchet 51, the lost-motion means in the hub of the latch member 5 will permit the latch member 5 to lift under the movement of the brake pedal 2 and fall again into a position to hold the brake applied as long as the clutch pedal is in a depressed position.

Figure 5:
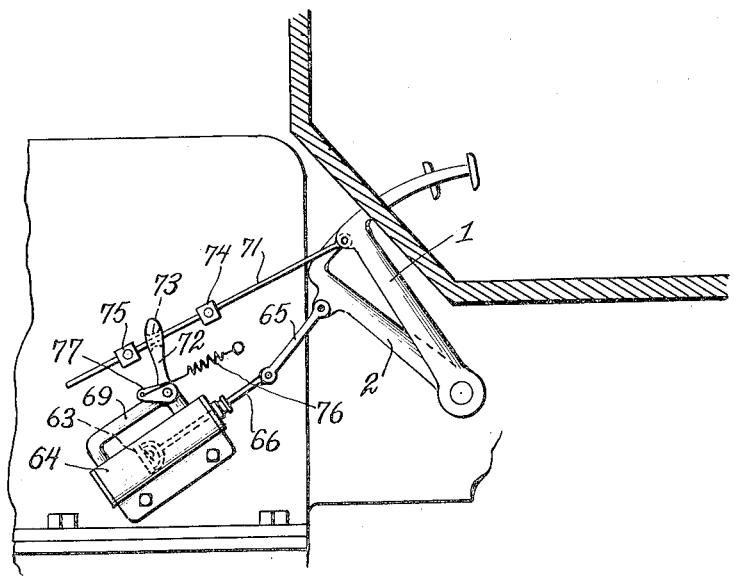
Fig. 5 is a side elevational view showing my invention embodied in a fluid-controlled device.
Figure 6:
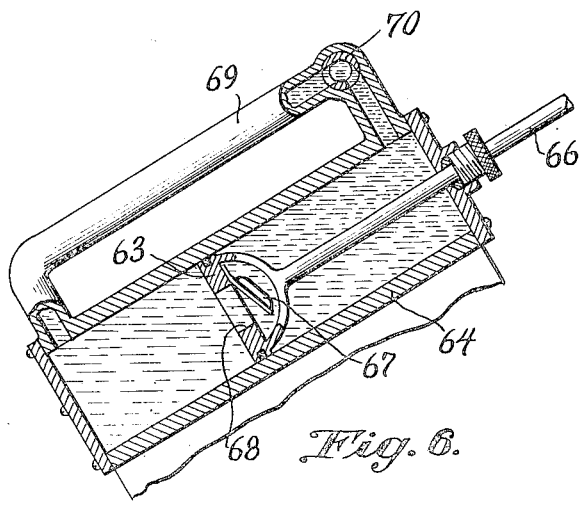
Fig. 6 is an enlarged sectional view of the fluid-controlled mechanism.

In the construction shown in Figs. 5 and 6, the brake pedal 2 is connected with a piston or plunger 63 operating in a fluid-containing cylinder 64 by means of a link 65 pivotally connected at one end with the pedal 2 and at the other end with the piston rod 66. This piston or plunger is provided with a one-way flap valve 67 which permits fluid to pass through the port 68 freely when the brake pedal is depressed but prevents movement through this port on the return movement of the plunger and brake pedal. A by-pass 69 is provided from one side of the piston to the other controlled by an oscillatable valve 70 which, in turn, is controlled by the clutch pedal 1. This control by the clutch pedal is effected by means of a link 71 pivotally connected with the clutch pedal and having a lost-motion connection with a rock arm 72 which operates the oscillatable valve 70 which controls the by-pass. This lost-motion connection is effected by extending the link 71 through an opening 73 in the rock arm 72 and providing a pair of adjustable stops 74 and 75 on the link 71, one on each side of the rock arm. In order to hold the oscillatable valve in either open or closed position a coil tension spring 76 is provided having one end secured to a suitable support and its other end secured to a rock arm 77 oscillatable with the control valve 70. This spring is movable past a dead center as the valve is moved from open to closed position and vice versa so that it will be held in either position to which it may be moved.

In operation, the by-pass valve 70 is open so long as the clutch pedal is in connecting position and under these circumstances the brake can be operated freely without being affected by the action of the piston 63. However, if the clutch pedal is depressed sufficiently to move the by-pass valve 70 to closed position the brake pedal will thereafter be held depressed to any position to which it may be moved as the check valve 67 will prevent a return movement of the plunger 63 and the brake pedal connected therewith. Under these circumstances, the piston 63 will hold the brake in applied position so long as the clutch pedal is held depressed permitting the driver to take his foot off the brake pedal used in operating the accelerator or in an emergency for operating the starter button.

However, as the clutch pedal is released, the by-pass valve will be moved to open position permitting the fluid to flow through the by-pass and allowing the brake pedal and associated parts to return to non-braking position. The construction would be operative without the flap check valve but this is provided to permit an easier movement on the downward stroke of the plunger and also to permit the brake pedal to be depressed if, by any chance, the by-pass should be blocked by the by-pass valve or by any other cause.

In Figs. 7 to 10, inclusive, is shown a construction in which the operativeness of the relation between the brake-holding latch 5 and the clutch-controlled rock arm 78 is controlled by the accelerator button 79. This control by the accelerator button is effected by means of a rock shaft 80 extending through a sleeve 81 on which the latch 5 and latch-controlling rock arm 82 are mounted and a cam member 83 secured to the end of this rock shaft 80 for controlling the pawl or dog 84 pivotally mounted on the latch-controlling rocker 82 and movable into and out of operative relation with respect to the clutch-controlled rocker 78 which is free to oscillate on the sleeve 81.

When the pawl 84 is in engagement with the clutch-controlled rocker 78, the latch-controlled rocker 82 will move with the clutch-controlled rocker 78 when the latter is actuated by the cam 21 but when the pawl 84 is moved out of operative relation with respect to the shoulder 85 on the clutch-controlled rocker 78 the clutch-control movement of the clutch-controlled rocker 78 will have no effect on the rocker 82 which controls the position of the latch 5. The control of this pawl is effected by means of the cam 83 on the rock shaft 80 which cooperates with a pin 86 on the pawl.

In the construction shown in Figs. 7 and 8 the latch member 5 may be placed in operative relation with respect to the ratchet 51 even when the clutch pedal 1 is in connecting position when the acelerator button is not depressed, as the cam 83 will be in a position to hold the pawl 84 in an inoperative position, thus permitting the engaging and disengaging of the clutch without effecting the latch member 5. Thus it will be seen that if the driver wishes to shift the gearing to neutral and allow the clutch to become connected he may do so while the brake remains held in braking relation and when it is desired to start the car again the depression of the clutch pedal to shift into gear will permit the clutch controlled rocker 78 to fall to its low position where it will receive the pawl 84 upon the depression of the accelerator button, after which the connecting movement of the clutch pedal will cause the brake holding elements to become released.

The latch member may be held in either operative or inoperative position by means of a leaf-spring member 59 having a pair of depressions 60 for cooperation with a pin or roller 92 mounted on the rock arm.

In a general way, the operation of this construction is as follows: In ordinary driving the accelerator button 79 is depressed sufficiently to move the cam block 87 to the position shown in Fig. 7 in which the rock arm 88 on the rock shaft 80 is raised and the cam 83 on the other end of the rock shaft is moved out of operative relation with respect to the pin 86 on the pawl. Under these circumstances, so long as the clutch pedal is in connecting position, the cam 21 on this pedal will lie underneath the roller 89 of the clutch-controlled rocker 78 and the latch 5 will be held out of operative relation with respect to the ratchet on the brake pedal 2, so long as the accelerator button 79 is not depressed.

If it should be desirable to stop the car on a grade the driver would take his foot off the accelerator 79 permitting the cam block 87 to move out of the path of the rock arm 88 whereupon the spring 90 would actuate the rock arm 80 to cause the cam 83 to move the pawl 84 out of operative relation with respect to the shoulder 85 on the clutch-controlled rocker. The driver would thereupon depress both the brake pedal and clutch pedal. The latch 5 would hold the brake pedal in depressed position, it being assumed that the latch-controlling rocker 82 has been placed in the position shown in Fig. 7 by means either of the foot control push button 91 or the link 92 connecting the latch-controlling rocker 82 and clutch pedal 1.

If the driver does not wish to keep the clutch pedal depressed while he is waiting he could move the gear shift lever to neutral and could thereupon release the clutch pedal without affecting a release of the latch 5 which holds the brake pedal as there would be no operative connection between the clutch-controlled rocker 78 and the latch-controlling rocker 82. When the driver desires to start the car again he would step on the accelerator 79 which would move the cam 83 out of the path of movement of the pin which controls the operativeness of the relation between the clutch-controlled rocker 78 and the latch-controlling rocker 82. The driver would also depress the clutch pedal and operate the gear shift lever. The depression of the clutch pedal would move the cam 21 out of the path of movement of the roller 89 permitting the rocker 78 to drop so that the pawl 84 could engage the shoulder 85 on the rocker. Thereafter the clutch pedal would be released to allow it to move to connecting position and this connecting movement of the clutch would lift the clutch-controlled rocker 78 and would actuate the latch-controlling rocker 82 because of the operative connection through the pawl 84 and this would move the brake-controlling latch 5 to allow the brake to be released.

In this construction also a retaining spring 59 is provided having a pair of depressions 60 for cooperation with a roller or pin 92a on the latch-controlling member 82 for holding the latch in either operative or inoperative position. The depressions 60 may be so arranged as to hold the rocker 82 in a position that the roller 89 will stand clear of the latch control cam 21 thus permitting a free movement of the pawl 84 during the movement of the accelerator button 79 which, as explained before, operates the cam 83 to lift and lower the pawl 84 there being a space between the shoulder 85 on the rock arm 78 and the end of the pawl 84 when the shoulder 94 is against the pin 98 in the rocker 82.

In this construction also the lost-motion connection 58 is provided between the hub of the latch member and the sleeve 81 on which it is mounted so that the latch may move to ride over the teeth of the ratchet 51.

The foot-controlled button 91 for controlling the position of the latch may be located in a position which will make it convenient for operation by the foot which is used to operate the clutch pedal as shown in Fig. 10.

In order to limit the movement of the clutch-controlled rocker a pin 93 is provided on the latch-controlling rocker 82 for cooperation with oppositely disposed shoulders 94 on the clutch-controlled rocker 78, as shown in Fig. 8. In order to permit operation of the latch-controlling rocker by means of the foot-operated button 91, without interference from the control exerted by the clutch pedal, the link 94a operated by the clutch pedal is slidably mounted in a projection 95 on this clutch pedal, an adjustable abutment 96 being provided so that when the projection strikes this abutment 96 the latch-controlling rocker 82 will be moved to bring the rocker to the position shown in Fig. 7.

I claim:

1. Apparatus for controlling an automobile comprising a brake pedal, a clutch pedal, and means for holding the brake pedal in brake-applying position, released by the connecting movement of the clutch, comprising a rockably mounted member for holding the brake pedal in brake-applying position, a rockably mounted member controlled by the clutch pedal for releasing the brake-holding member, said rockable members being rockable as a unit about an axis extending longitudinally of the axes of said pedals.

2. Control apparatus for automobiles comprising means for applying the brake, means for connecting and disconnecting the clutch, and means for holding the brake pedal in brake-applying position, released by the connecting movement of the clutch, comprising a rockable member, a pawl pivotally mounted on said rockable member and a ratchet member controlled by said pawl, said pawl being movable past a dead center position whereby when in operative position it will be held automatically against releasing action.

3. Control apparatus for automobiles comprising means for applying the brake, means for connecting and disconnecting the clutch, and means for holding the brake pedal in brake-applying position, released by the connecting movement of the clutch connecting and disconnecting means, comprising a pawl pivotally mounted and an element simultaneously movable with said brake applying means controlled by said pawl, and means movable to or past a dead center position whereby, when in operative position, said pawl will be held automatically against releasing action.

4. An automobile control construction comprising a clutch pedal, a brake pedal, a foot accelerator, a latch member for holding the brake pedal in applied position, means operated by the connecting movement of the clutch pedal for releasing the latch, and means actuated by the retarding movement of the accelerator for rendering the movement of said releasing means inoperative to release the latch.

5. An automobile control construction comprising a clutch pedal, a brake pedal, a foot accelerator, a latch member for holding the brake pedal in applied position, means operated by the connecting movement of the clutch pedal for releasing the latch member, and means actuated by the accelerating movement of the accelerator to place the releasing means in operative relation to the latch whereby the connecting movement of the clutch pedal will actuate the latch to release the brake pedal.

6. An automobile construction comprising clutch controlling means, brake controlling means, accelerating means, means for holding the brake controlling means in applied position, means operated by the connecting movement of the clutch controlling means for releasing said holding means, and means actuated by the accelerator for controlling the operativeness of the relation between the clutch controlling means and the releasing means.

7. An automobile construction comprising clutch controlling means, brake controlling means, accelerating means, means for holding the brake controlling means in applied position, means operated by the movement of the clutch controlling means for releasing said holding means and means controlled by the accelerating means to prevent the release of said holding means by said movement of the clutch controlling means.

8. An automobile control construction comprising a clutch pedal, a brake pedal, an accelerator, a latch member for holding the brake pedal in applied position, means operated by the connecting movement of the clutch pedal for releasing the latch, and means actuated by the retarding movement of the accelerator for rendering the movement of said releasing means inoperative to release the latch.

9. An automobile control construction comprising a clutch pedal, a brake pedal, an accelerator, a latch member for holding the brake pedal in applied position, means operated by the connecting movement of the clutch pedal for releasing the latch, and means actuated by the accelerating movement of the accelerator to place the releasing means in operative relation to the latch whereby the connecting movement of the clutch pedal will actuate the latch to release the brake pedal.

CHARLES B. GILMORE.